(12) United States Patent
Seki (10) Patent No.: US 10,533,845 B2
(45) Date of Patent: Jan. 14, 2020

(54) MEASURING DEVICE, MEASURING METHOD, SYSTEM AND MANUFACTURING METHOD

(71) Applicant: CANON KABUSHIKI KAISHA, Tokyo (JP)

(72) Inventor: Takashi Seki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 434 days.

(21) Appl. No.: 15/268,943

(22) Filed: Sep. 19, 2016

(65) Prior Publication Data

US 2017/0089691 A1   Mar. 30, 2017

(30) Foreign Application Priority Data

Sep. 28, 2015 (JP) ................... 2015-189645

(51) Int. Cl.
*G01B 11/25* (2006.01)

(52) U.S. Cl.
CPC .................... *G01B 11/25* (2013.01)

(58) Field of Classification Search
CPC ....................................................... G01B 11/26
USPC ........................................................ 348/86
See application file for complete search history.

(56) References Cited

U.S. PATENT DOCUMENTS

| 2011/0317130 | A1* | 12/2011 | Gollier | G02B 27/48 |
| | | | | 353/20 |
| 2013/0258354 | A1* | 10/2013 | Ando | G01B 11/00 |
| | | | | 356/625 |
| 2013/0266205 | A1* | 10/2013 | Valpola | G06K 9/78 |
| | | | | 382/153 |

FOREIGN PATENT DOCUMENTS

JP           2009019884 A        1/2009

\* cited by examiner

*Primary Examiner* — Joseph G Ustaris
*Assistant Examiner* — Amir Shahnami
(74) *Attorney, Agent, or Firm* — Rossi, Kimms & McDowell LLP (57) ABSTRACT

A measuring device for measuring an object includes a controller, a projector, an imaging unit, and a processor, the controller controls the projector and the imaging unit to start projection and imaging in a second condition after starting projection and imaging in a first condition, and to start imaging in the second condition with a time interval of an integer multiple of a period of intensity of light other than a pattern of light from an imaging start time in the first condition, and the processor obtains intersection point positions of gradation values between image data obtained at the same imaging time in each condition among image data obtained at each imaging time in the first condition and image data obtained at each imaging time in the second condition, and calculates the shape information based on the obtained intersection point positions.

9 Claims, 5 Drawing Sheets

MEASURING DEVICE, MEASURING METHOD, SYSTEM AND MANUFACTURING METHOD

BACKGROUND OF THE INVENTION

Field of the Invention

The present invention relates to a measuring device, a measuring method, a system and a manufacturing method.

Description of the Related Art

As a device for measuring a shape of a measurement object, an optical type measuring device which uses a pattern projection method is known. In the pattern projection method, a predetermined pattern of light is projected onto a measurement object to perform imaging, a pattern is detected from image data, and distance information on each pixel position is calculated from principles of triangulation, and thereby a shape of the measurement object is obtained. As the pattern projection method, a spatial coding method for performing binary encoding of a space by projecting a pattern of light alternately having bright lines and dark lines is often used. In order to improve measurement accuracy using the spatial coding method, it is necessary to accurately determine a boundary between a bright portion and a dark portion from obtained image data.

As a method of accurately determining a boundary between a bright portion and a dark portion, there is a method of projecting a first pattern of light which alternately has bright portions and dark portions and a second pattern of light which has the bright portions and the dark portions of the first pattern of light in reverse and is complementary to the first pattern of light, and determining intersection points of these patterns of light as a boundary. Respective patterns of light are complementary to each other, and as long as the same plane is measured, a distance between the intersection points coincides with a width of the bright portions (or a width of the dark portions). However, in actual measurement, due to an effect of ambient light (room light such as a fluorescent lamp), the complementary relationship collapses, and intersection point positions deviate in some cases. It is hard to distinguish whether deviations of the intersection point positions are caused by ambient light or are caused by a shape of a measurement object. As a result, measurement accuracy is lowered. As a method of reducing the effect of ambient light, a method of synchronizing imaging timing with a period of an integer multiple of a commercial power frequency (50 Hz, 60 Hz) to reduce the effect of ambient light is known (Japanese Patent Laid-Open No. 2009-19884).

SUMMARY OF THE INVENTION

However, the invention described in Japanese Patent Laid-Open No. 2009-19884 has a waiting time for synchronizing imaging timings and is disadvantageous in terms of measurement time.

This invention is intended to provide a measuring device and a measuring method which are advantageous in terms of, for example, measurement accuracy and measurement time.

In order to solve the problem, the invention is directed to a measuring device which measures an object, the measuring device comprising: a control unit configured to acquire information on a period of intensity of light other than a pattern of light radiated to the object, and control a projector configured to project a first pattern of light having bright portions and dark portions or a second pattern of light having the bright portions and the dark portions of the first pattern in reverse onto the object and an imaging unit configured to acquire image data by imaging the object onto which the patterns of light are projected based on the acquired information on the period; and a processor configured to calculate information of the shape of the object based on the image data obtained by the imaging unit, wherein a first condition includes a first combination of a plurality of patterns of light including at least one of the first pattern of light and the second pattern of light, and the number of times of imaging and imaging time intervals when the imaging unit images the object onto which a pattern of light is projected for each of the plurality of patterns of light, a second condition includes a second combination in which the first pattern of light and the second pattern of light of the first combination are switched, and the number of times of imaging and imaging time intervals the same as the number of times of imaging and the imaging time intervals of the first condition, the control unit controls the projector and the imaging unit to start projection using the projector and imaging using the imaging unit in the second condition after starting projection using the projector and imaging using the imaging unit in the first condition, and to start imaging using the imaging unit in the second condition with a time interval of an integer multiple of the period from an imaging start time using the imaging unit in the first condition, and the processor obtains intersection point positions of gradation values between image data using image data obtained at the same imaging time in each condition among image data obtained at each imaging time in the first condition and image data obtained at each imaging time in the second condition, and calculates information of a shape of the object based on the obtained intersection point positions.

Further features of the present invention will become apparent from the following description of exemplary embodiments with reference to the attached drawings.

DESCRIPTION OF THE EMBODIMENTS

The following describes an embodiment of the present invention with reference to drawings and the like.

First Embodiment

Figures 1A, 1B, 1C:
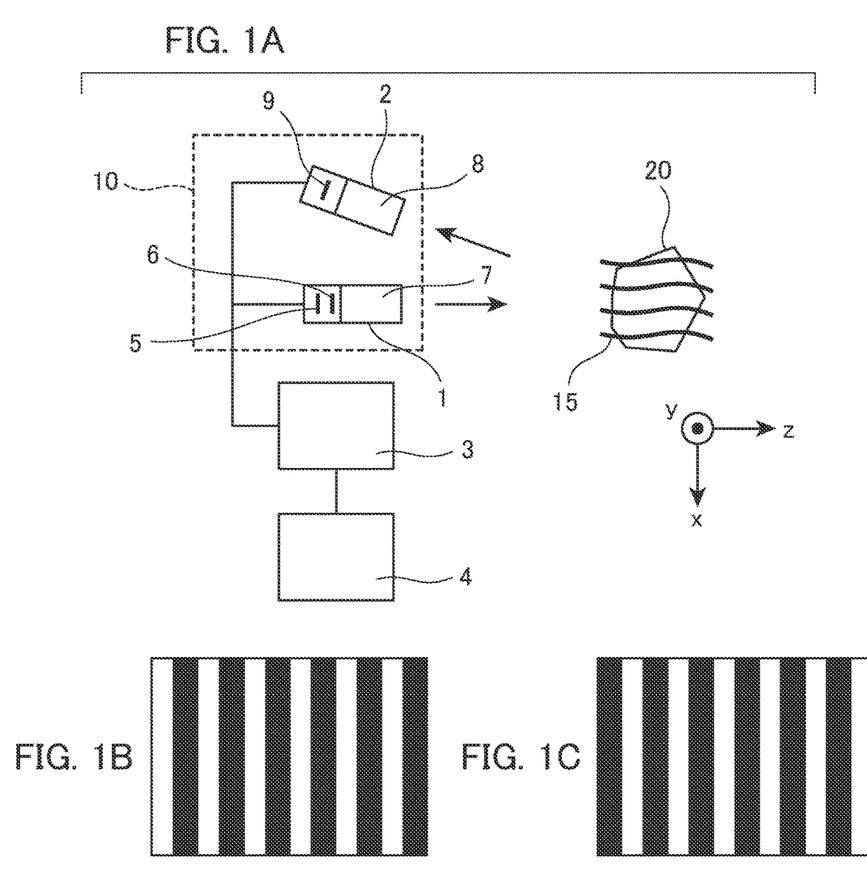
FIG. 1A is a schematic diagram which shows a configuration of a measuring device according to a first embodiment.
FIG. 1B is a diagram which shows a first pattern of light.
FIG. 1C is a diagram which shows a second pattern of light.
Figure 1D:
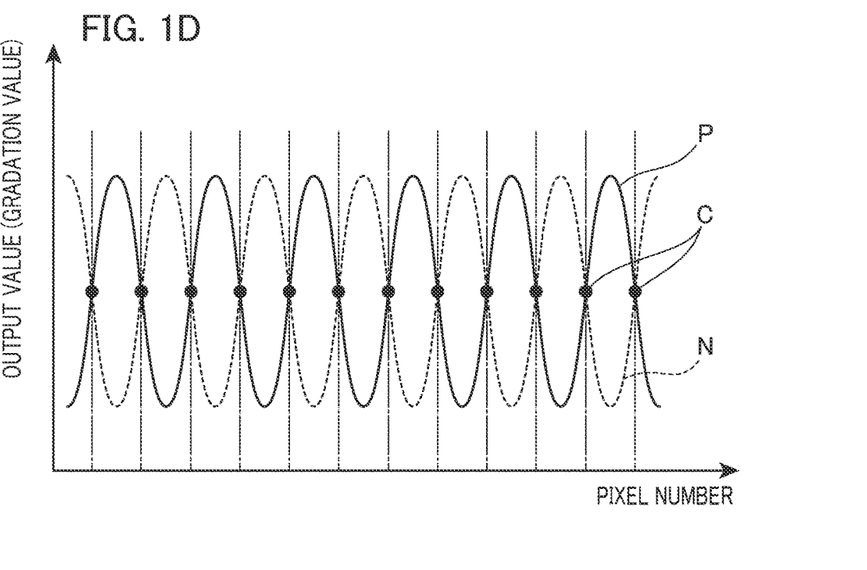
FIG. 1D is a diagram which shows a gradation value distribution.

FIG. 1A is a schematic diagram which shows a configuration of a measuring device according to a first embodiment. FIGS. 1B and 1C are diagrams which show a first pattern of light alternately having bright portions and dark portions and a second pattern of light having the bright portions and the dark portions of the first pattern of light in reverse. FIG. 1D is a gradation value distribution when the first pattern of light and the second pattern of light are projected onto a reference plane. The measuring device of the present embodiment includes a head 10, a control unit 3, and a processor 4. The head 10 includes a projector 1 and an imaging unit 2, the projector 1 includes a light emitting unit 5, a pattern setting element 6, and a projection optical system 7, and the imaging unit 2 includes an image lens 8 and a sensor element 9. A direction in which a pattern of light is projected onto a measurement object 20 is set as a z axis, and axes orthogonal to the z axis are set as an x axis and a y axis.

The projector 1 sets (forms) light emitted from the light emitting unit 5 as a pattern of light 15 using a pattern setting element 6, and projects the light onto the measurement object 20 through the projection optical system 7. A liquid crystal element, a digital mirror device (DMD), or the like is used as the pattern setting element 6, and makes it possible to set (select) an arbitrary pattern of light. The light emitting unit 5 is preferably a light emitting element such as an LED or the like, or a combination form of the light emitting element and a uniform illumination system for reducing unevenness in brightness. The imaging unit 2 images the measurement object 20 to which the pattern of light 15 is projected by directing light from the measurement object 20 onto a light receiving surface of the sensor element 9 by the image lens 8, and obtains image data. The sensor element 9 is preferably a photoelectric conversion element such as a CMOS or a CCD. The light emitting unit 5, the pattern setting element 6, and the sensor element 9 are controlled by the control unit 3, and light emitting, pattern setting, and imaging are performed at arbitrary timings.

Data on gradation values (brightness) of the image data imaged by the imaging unit 2 corresponds to pixels and is stored in the processor 4. Since a relationship between relative positions and postures of the projector 1 and the imaging unit 2 is already known, coordinates of points on a surface of the measurement object 20 are calculated on the basis of triangulation by the processor 4 to obtain a shape of the measurement object 20. When the coordinates of points on a surface of the measurement object 20 are calculated, at least one set of patterns of light 15 is projected and gradation distributions (brightness distributions) of each pattern of light are imaged by the imaging unit 2. One of the patterns of light 15 is a first pattern of light having bright portions and dark portions as shown in FIG. 1B. Another is a second pattern of light which has a reversed relationship between bright portions and dark portions with respect to the first pattern of light, that is, a complementary relationship to the first pattern of light as shown in FIG. 1C. If the first pattern of light and the second pattern of light are radiated to a plane serving as a reference for measurement, the gradation distribution is as shown in FIG. 1D.

The processor 4 calculates an intersection point C of a first gradation distribution P in which the first pattern of light is projected and a second gradation distribution N in which the second pattern of light is projected as shown in FIG. 1D. In the case of the present embodiment in which a ratio of the bright portions to the dark portions of the first pattern of light and the second pattern of light is 1 to 1, if the intersection point C is detected with respect to the plane serving as a reference, the intersection point C is a constant pitch. If the measurement object 20 is measured, the intersection point C is displaced from a constant pitch position to the extent of the shape of the measurement object 20 with respect to the reference plane. Using this displacement, a Z coordinate of the measurement object 20 is calculated.

Figure 2A:
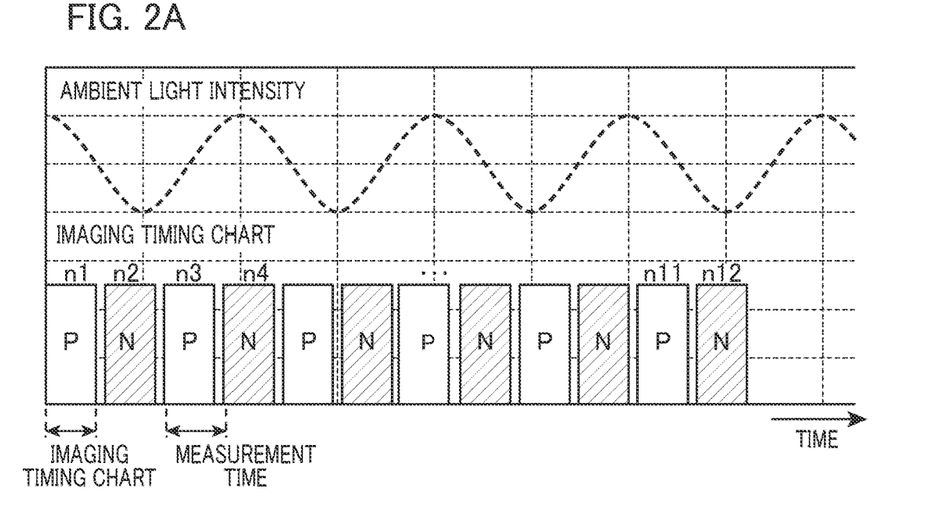
FIG. 2A is a diagram which shows time variations in an ambient light intensity and an imaging timing chart.
Figure 2B:
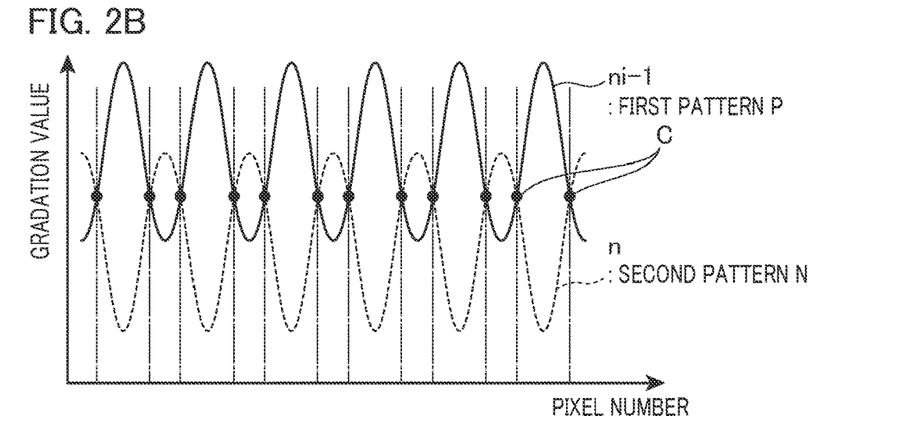
FIG. 2B is a diagram which shows a gradation distribution and an intersection point.
Figure 2C:
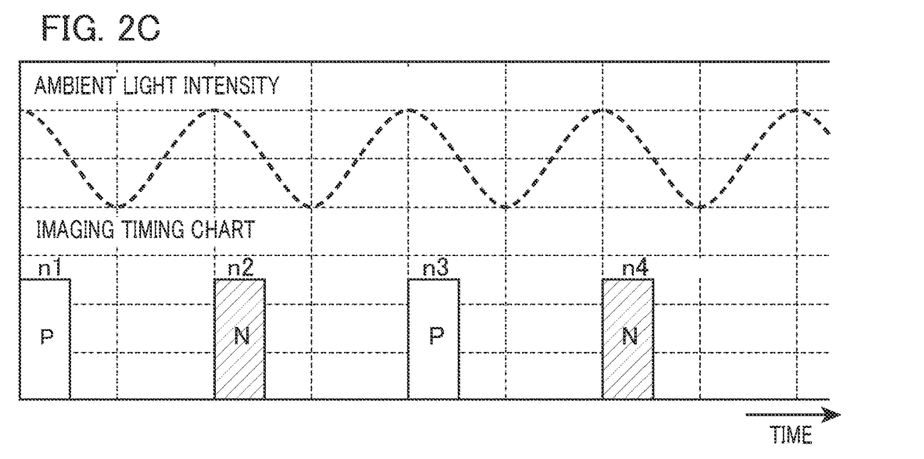
FIG. 2C is a diagram which shows the time variations in ambient light and the imaging timing chart.

Next, effects of light other than the patterns of light (ambient light) radiated to the measurement object 20 will be described. Ambient light such as that from a fluorescent lamp (illumination lamp) in a measurement environment (space) in which the measurement object 20 is disposed has a flicker and a varying intensity according to a frequency of power (50 Hz, 60 Hz, and the like). FIG. 2A shows time variations in an ambient light intensity and an imaging timing chart in a comparative example. A period (cycle) of the intensity of ambient light and each imaging timing chart are not synchronized with each other. FIG. 2B shows gradation distributions and intersection points obtained by the imaging timings (image intervals) shown in FIG. 2A. FIG. 2C shows the time variations in an ambient light intensity and the imaging timing chart if imaging is performed in synchronization with the period of the intensity of ambient light.

In FIG. 2A, a first pattern and a second pattern are represented as P and N, respectively, and an imaging order is represented as n1, n2, . . . , and n12. For example, a pattern imaged at n1 is the first pattern. An ambient light intensity varies with time. FIG. 2B is an example in which an odd-numbered 2i−1 (where i is a natural number) in the imaging order is set as the first pattern and an even-numbered 2i is set as the second pattern, and intersection points of the $(2i-1)^{th}$ imaged pattern and the $(2i)^{th}$ imaged pattern are detected on the plane serving as a reference. If the ambient light intensity is sufficiently small with respect to intensity of the pattern of light 15, the intersection points have a constant pitch as described above. However, if the ambient light intensity is large and each of imaging timings is not synchronized with intensity of ambient light, an offset of the ambient light occurs in an output value. As a result, positions of the intersection points as shown in FIG. 2B deviate from the constant pitch. Deviation (error) from the constant pitch due to the ambient light is not distinguished from deviation from the reference plane due to a shape of the measurement object 20. Therefore, there is a possibility of a measurement error being generated by the ambient light. As a method to avoid this, as shown in FIG. 2C, a method of performing imaging in synchronization with a period of ambient light intensity (see Japanese Patent Laid-Open No. 2009-19884) is known, but a waiting time to synchronize with the ambient light increases a measurement time.

Figure 3:
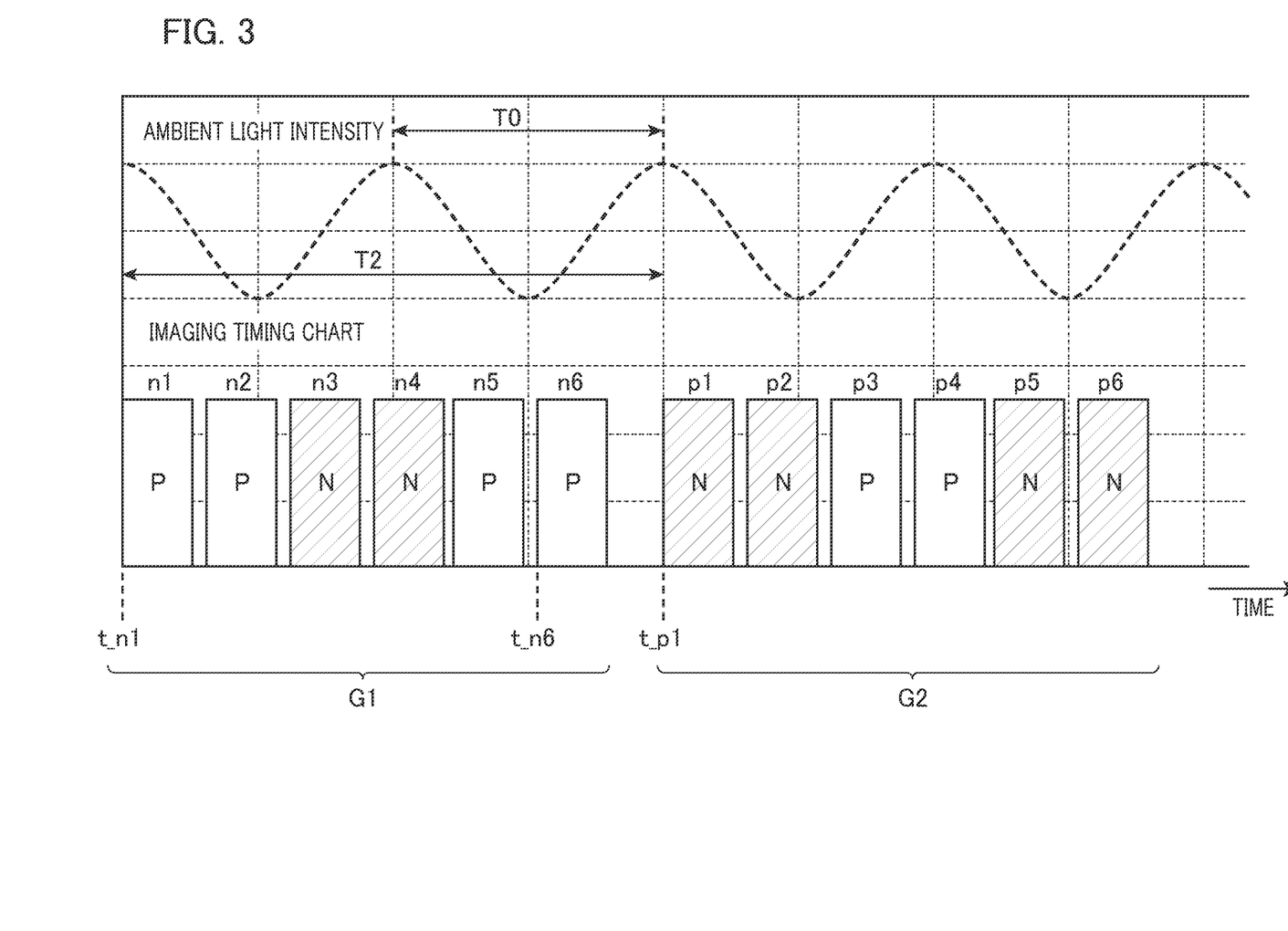
FIG. 3 is a diagram which shows an imaging timing chart according to the first embodiment.

FIG. 3 shows an imaging timing chart according to the present embodiment. In the same manner as in FIG. 2A, the first pattern and the second pattern are represented as P and N, respectively. In the embodiment, the control unit 3 controls the projector 1 and the imaging unit 2 in accordance with a first condition and a second condition. Each condition includes a combination of the first pattern P and the second pattern N, the number of times of imaging, and an imaging interval. A group of patterns imaged by the first condition is set as a first group G1, and a group of patterns imaged by the second condition is set as a second group G2. Imaging order in the first group G1 is set to n1, n2, . . . , and n6, and a pattern imaged at each timing is set to {P, P, N, N, P, and P} (a first acquisition process). An image order in the second group G2 is set to p1, p2, . . . , and p6, and a pattern imaged at each timing is set to {N, N, P, P, N, and N} (a second acquisition process). The control unit 3 controls the pattern setting element 6 and the sensor element 9 so that patterns imaged at a timing ni and patterns imaged at a timing pi are in a complementary relationship.

A time interval between a start time tn1 of the first acquisition process for acquiring image data according to the first condition and a start time tp1 of the second acquisition process for acquiring image data according to the second condition is set to an integer multiple (γ times) of a period T0 of the intensity of ambient light. However, depending on accuracy determined by a clock mounted on the control unit 3, calculation accuracy of the processor 4, and the like, the time interval does not strictly coincide with γ times the period T0 of the intensity of ambient light. It is preferable to determine γ and a minimum period of a sensor so that a difference between $t_{p1}$ and an imaging start time $t_{p6}$ at a timing n6 is equal to or greater than a minimum period of the sensor element 9 (maximum sampling number or less) and γ becomes a minimum value. In addition, the period T0 of the intensity of ambient light may be obtained by measuring the ambient light in advance. Moreover, if a light source is dependent on a commercial frequency such as a fluorescent lamp or mercury lamp (50 Hz, 60 Hz), the period T0 of the intensity of ambient light may be obtained from an inverse number of an integer multiple of a commercial power frequency (50 Hz, 60 Hz). Furthermore, a frequency of each power may be measured to reduce errors caused by a commercial power frequency generated for each power. A frequency of the intensity of ambient light is acquired by an acquisition unit (not shown).

The control unit 3 controls the sensor element 9 so that a measurement interval (imaging interval) for each timing in the first group G1 is equal to a measurement interval for each timing in a second group G2 in the accuracy described above. In other words, the control unit 3 controls the sensor element 9 so that respective corresponding timings between groups are equal to each other in the accuracy described above. Here, a measurement interval for each timing in one group may be an unequal interval, and may be a desired measurement interval which is not limited to an integer multiple of the period T0 of the intensity of ambient light. However, it is a most preferred form to be determined by a minimum period which can be realized by the sensor element 9.

The processor 4 performs operation processing of detecting an intersection point by correlating an imaging order of the first group G1 with an imaging order of the second group G2. For example, the operation processing of detecting an intersection point is performed by correlating n1 with p1. Here, averaging processing may be performed on intersection point positions after intersection point detection is first performed a plurality of times, or the intersection point detection may be performed after averaging processing is first performed on each of an image of the first pattern and an image of the second pattern. A shape of the measurement object 20 is calculated based on the intersection point positions (shape calculation process).

According to control by this control unit 3, a set of images detecting an intersection point (that is, a set of images imaged at a timing n1 and images imaged at a timing p1) are equal to each other in light amount of ambient light. That is, it is possible to reduce effects of ambient light and to reduce measurement errors. In addition, if a group interval (time interval) T2 and measurement intervals (a measurement interval between ni+1 and ni, a measurement interval between pi+1 and pi) in each group are appropriately controlled, a measurement time can also be reduced.

As described above, according to the embodiment, it is possible to provide a measuring device and a measuring method advantageous in terms of measurement accuracy and measurement time.

Second Embodiment

Next, a measuring device according to a second embodiment of the present invention will be described. The embodiment is characterized in that a measurement interval T1 in a group is set to a fixed value (period). An interval (imaging interval) between respective timings in the first group G1 and the second group G2 is set to T1, a period of intensity of ambient light is set to T0, and the number of times of measurement in the first group G1 and the second group G2 is set to M. Conditions of a group interval T2 with a reduced effect of ambient light are conditions satisfying the following expression (1) for an integer α obtained by rounding up to the nearest whole number after dividing M×T1 (total imaging time of the first group G1) by the period T0 of the intensity of ambient light.

$$T2 = \gamma \times T0 \geq \alpha \times T0 \qquad (1)$$

Here, γ is an arbitrary integer. Expression (1) is an expression that defines an imaging start timing of the second group G2. In addition, if a reduction in the measurement time is considered, the group interval T2 satisfying the following Expression (2) for an integer β obtained by rounding up decimals of T1/T0 to the nearest whole number is a condition to realize reduction in effects of ambient light and reduction in the measurement time.

$$T2 = \gamma \times T0 < M \times \beta \times T0 \qquad (2)$$

In addition, a relationship of a following Expression (3) is derived from Expression (1) and Expression (2).

$$\alpha \leq \gamma < M \times \beta \qquad (3)$$

If an integer γ satisfying Expression (3) is set, it is possible to reduce both the effects of ambient light and the measurement time. In the embodiment, the imaging period T1 may be controlled by the control unit 3 or an internal clock of the sensor element 9. It is preferred that the group interval T2 is controlled by a trigger signal from the control unit 3 to the sensor element 9.

Figure 4A:
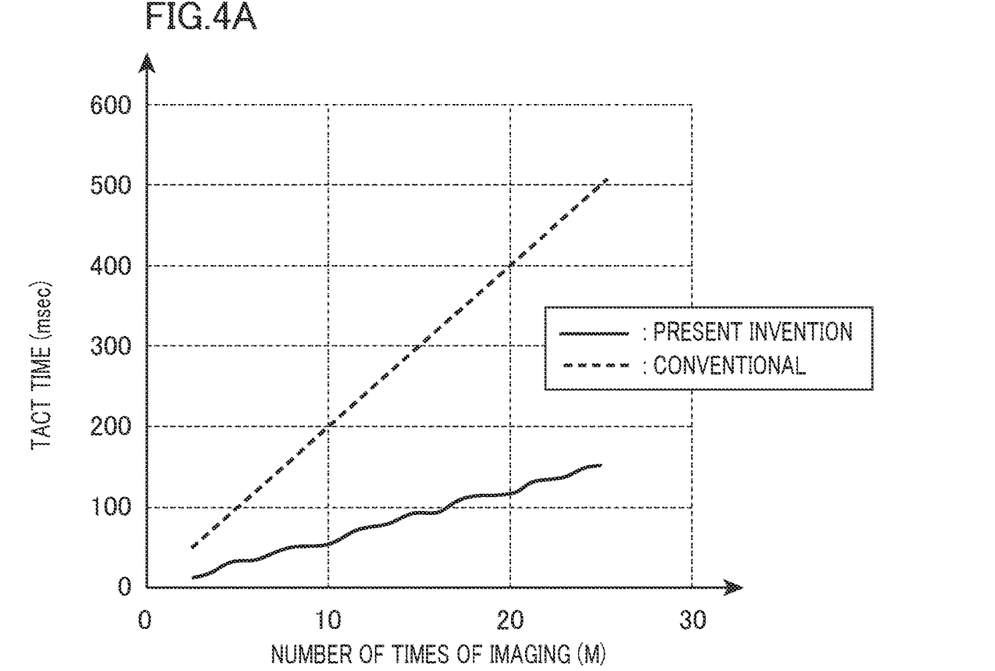
FIG. 4A is a graph which shows a shortened tact time.

FIG. 4A is a graph which shows a waiting time (tact time) for which imaging is not performed to synchronize the imaging period T1 with the period T0 of the intensity of ambient light if the imaging period T1 is smaller than the period T0 of the intensity of ambient light. A horizontal axis is set to the number of times of imaging (M2) and a vertical axis is set to a tact time (msec). In this example, the period T0 of an ambient light intensity is set to 10 msec and the imaging period T1 is set to 3 msec. A solid line in a drawing represents the tact time according to the embodiment and a dashed line in the drawing represents a conventional example. As seen in FIG. 4A, it is known that the tact time in the embodiment is shorter than in the conventional example at any number of times of measurement. Moreover, it is known that the tact time is greatly shortened as the number of times of measurement becomes large.

Figure 4B:
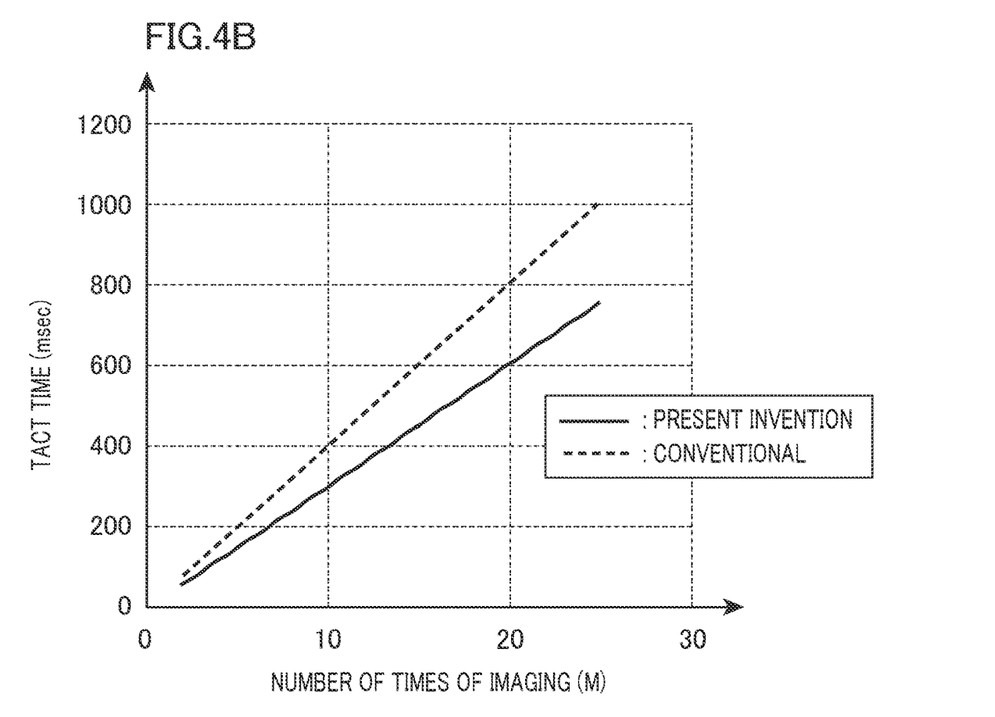
FIG. 4B is a graph which shows the shortened tact time.

FIG. 4B is a graph which shows a tact time if the imaging period T1 is larger than the period T0 of an ambient light intensity. In this example, the period T0 of ambient light is set to 10.1 msec and the imaging period T1 is set to 15 msec. In the same manner as in FIG. 4A, it is known that the tact time in the embodiment is shorter than in the conventional example at any number of times of measurement. Furthermore, it is known that the tact time is greatly shortened as the number of times of measurement becomes large. As described above, according to the embodiment, it is possible to provide a measuring device and a measuring method advantageous in terms of measurement accuracy and measurement time.

Third Embodiment

Next, a measuring device according to a third embodiment of the present invention will be described. In the second embodiment, the group interval T2 and the imaging period T1 are controlled by different signals. The embodiment is characterized in that the group interval T2 and the imaging period T1 can be controlled by the same trigger signal by the control unit 3 or the same internal clock of the sensor element 9. First of all, a minimum sampling period (shortest imaging interval) of the sensor element 9 is set to T1', and an imaging period T1 which satisfies the following expression (4) for an integer η obtained by rounding up decimals of M×T1'/T0 is set.

$$T1 = \eta \times T0/M \quad (4)$$

Here, a minimum sampling period T1' in the present embodiment refers to a time considering projection brightness of the projector 1, a required exposure time due to reflectance of the measurement object 20, a sampling period due to a constraint of an electrical circuit of the sensor element 9, and the like. Next, a group interval T2 satisfying the following expression (5) is set.

$$T2 = M \times T1 = \eta \times T0 \quad (5)$$

As shown in this expression, since the group interval T2 is a multiple of the imaging period T1, these can be controlled by the same trigger signal of the control unit 3 or the same internal clock in the sensor element 9.

For example, the period T0 of ambient light intensity is set to 10 msec, the number of times of measurement M is set to 7, and the minimum sampling period T1' of the sensor element 9 is set to 3 msec, it is determined that T1 is 4.29 msec, and T2 is 30 msec based on Expression (4) and Expression (5). According to the present example, the tact time is 60 msec which is shortened by about 60% with respect to a conventional measurement time of 140 msec. In addition, if seen from a reverse viewpoint, it is possible to increase the number of times of measurement (M=16 in the present example) in the same measurement time, and to improve an S/N ratio by an averaging effect.

According to the embodiment, effects of ambient light can be reduced and tact time can be made shorter than in the related art by easy control. T1' is referred to as a minimum sampling period, but it is not limited thereto as long as conditions described in the embodiments so far are satisfied.

In the embodiments described above, a total imaging time is divided into two groups, but even if it is divided into four or more even numbered groups, no essential differences are made from the present invention and no changes are made in the effects of the present invention. Moreover, the first group and the second group may not need to be successively imaged, and even if, for example, a third pattern between the first group and the second group is imaged, the effects of the invention are not changed.

In addition, the first pattern of light and the second pattern of light may not be a pattern of light of a period in which bright portions are the same as dark portions, but may be a pattern of light in which a portion of the bright portions and the dark portions is reversed. The bright portions and the dark portions are determined by a relative light intensity value, and reversal refers to a switched relationship of relative magnitudes of light intensity. A reversal of the bright portions is not necessarily the dark portions with zero light intensity. Furthermore, a plurality of patterns of light in each group are not limited to the embodiments described above, but patterns of light in the first group G1 may all be set to P, patterns of light in the second group G2 may all be set to N, and each group may include at least one of P and N.

Fourth Embodiment

Figure 5:
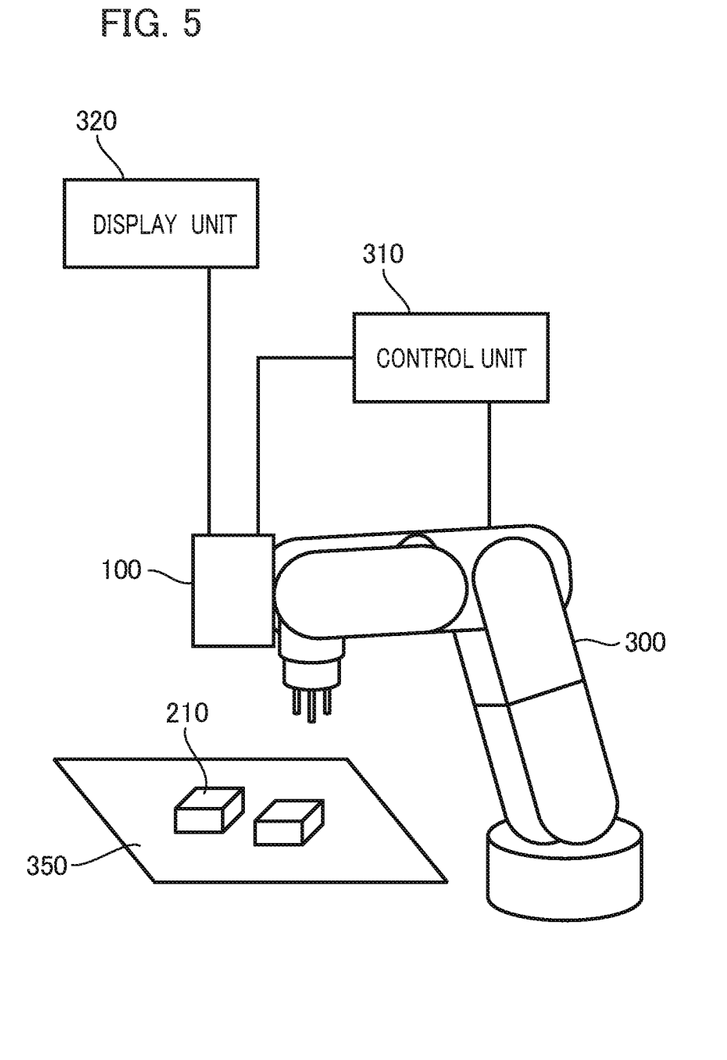
FIG. 5 is a diagram which shows a control system including the measuring device and a robot arm.

The measuring device described above is used while being supported by a certain support member. In the present embodiment, as an example, a control system used in a robot arm 300 (gripping device) as shown in FIG. 5 is described. The measuring device 100 performs imaging by projecting patterns of light onto an inspection object 210 placed on a support 350 and acquires an image. Then, a control unit of the measuring device 100 or the control unit 310 which acquires image data from the control unit of the measuring device 100 obtains information on a position and a posture of the inspection object 210, and the control unit 310 acquires the obtained information on a position and a posture. The control unit 310 controls the robot arm 300 by sending a drive command to the robot arm 300 based on the information on a position and a posture of the inspection object. The robot arm 300 holds the inspection object 210 at a front end of a robot hand or the like (gripper) and performs a movement such as translation or rotation. Moreover, it is possible to manufacture articles made up of a plurality of components, such as an electronic circuit board and machinery, by assembling the inspection object 210 with other components using the robot arm 300. In addition, it is possible to manufacture articles by processing the moved inspection object 210. The control unit 310 has an operation device such as a CPU or a storage device such as a memory. A control unit for controlling a robot may be provided outside the control unit 310. Moreover, measurement data measured by the measuring device 100 or acquired images may be displayed on a display unit 320 such as a display.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-189645 filed Sep. 28, 2015, which is hereby incorporated by reference herein in its entirety.

What is claimed is:

1. A measuring device which measures an object, the measuring device comprising:
   a control unit configured to acquire information on a period of intensity of a light other than patterns of light radiated to the object, and control a projector configured to project a first pattern of light having bright portions and dark portions or a second pattern of light having the bright portions and the dark portions of the first pattern of light in reverse onto the object and an imaging unit configured to acquire image data by imaging the object onto which the patterns of light are projected; and
   a processor configured to calculate information of the shape of the object based on the image data obtained by the imaging unit, wherein:
   the control unit controls the projector to project a first group of patterns of light onto the object by projecting first patterns of light and second patterns of light in a first sequential order and controls the imaging unit to image the object at each time a pattern of light of the first group of patterns of light is projected onto the object to respectively obtain image data of the object for each projected pattern of light of the first group of patterns of light, the control unit controls the projector to project a second group of patterns of light onto the object by projecting first patterns of light and second patterns of light in a second sequential order different from the first sequential order and controls the imaging unit to image the object at each time a pattern of light of the second group of patterns of light is projected onto the object to respectively obtain image data of the object for each projected pattern of light of the second group of patterns of light, the second sequential order being a sequential order of first patterns of light and second patterns of light in which the first patterns of light and the second patterns of light projected in the first sequential order are swapped with each other, a time interval between (i) a time when the imaging unit starts to obtain the image data of the object for each projected pattern of light of the first group of patterns of light and (ii) a time when the imaging unit starts to obtain the image data of the object for each projected pattern of light of the second group of patterns of light equals an integer multiple of the period of intensity of the light other than the patterns of light radiated to the object, and the processor obtains intersection point positions of gradation values between (iii) the respective image data of the object for each projected pattern of light of the first group of patterns of light and (iv) the respective image data of the object for each projected pattern of light of the second group of patterns of light obtained at corresponding imaging times when the first group of patterns of light and the second group of patterns of light are projected onto the object, and calculates information of a shape of the object based on the obtained intersection point positions.

2. The measuring device according to claim 1, wherein, in a case where an imaging interval of the imaging unit is set to a constant value T1, a number of times of imaging by the imaging unit is set as M, the period of intensity of the light other than the patterns of light radiated to the object is set as T0, and the time interval of the integer multiple of the period of intensity of the light other than the patterns of light radiated to the object is set as T2, the control unit controls the projector and the imaging unit using T2 satisfying M×β×T0>T2≥α×T0 for an integer α obtained by rounding up decimals of M×T1/T0 and an integer β obtained by rounding up decimals of T1/T0.

3. The measuring device according to claim 1, wherein, in a case where an imaging interval of the imaging unit is set to a constant value T1, a minimum imaging interval of the imaging unit is set as T1', a number of times of imaging by the imaging unit is set as M, and the period of intensity of the light other than the patterns of light radiated to the object is set as T0, T1 satisfies T1=η+T0/M for the integer η obtained by rounding up decimals of M+T1'/T0.

4. The measuring device according to claim 1, wherein the period of intensity of the light other than the patterns of light radiated to the object is an a inverse number of an integer multiple of a commercial power frequency.

5. The measuring device according to claim 1, wherein the processor obtains intersection point positions of gradation values between image data obtained at the corresponding imaging times among image data obtained at each imaging time of the object for each projected pattern of light of the first group of patterns of light and image data obtained at each imaging time of the object for each projected pattern of light of the second group of patterns of light, and then performs averaging on the intersection point positions and calculates information of a shape of the object based on the averaged intersection point position.

6. The measuring device according to claim 1, wherein the processor performs averaging on image data obtained at each imaging time of the object for each projected pattern of light of the first group of patterns of light, performs averaging on image data obtained at each imaging time of the object for each projected pattern of light of the second group of patterns of light, and obtains intersection point positions of gradation values between the averaged image data and calculates information of a shape of the object based on the intersection point positions of gradation values between the averaged image data.

7. A method of measuring an object by projecting a first pattern of light having bright portions and dark portions and a second pattern of light having the bright portions and the dark portions of the first pattern of light in reverse onto the object, the method comprising:

acquiring information on a period of intensity of a light other than first and second patterns of light radiated to the object;

projecting a first group of patterns of light onto the object by projecting first patterns of light and second patterns of light in a first sequential order and imaging the object at each time a pattern of light of the first group of patterns of light is projected onto the object to respectively obtain image data of the object for each projected pattern of light of the first group of patterns of light;

projecting a second group of patterns of light onto the object by projecting first patterns of light and second patterns of light in a second sequential order different from the first sequential order and imaging the object at each time a pattern of light of the second group of patterns of light is projected onto the object to respectively obtain image data of the object for each projected pattern of light of the second group of patterns of light, the second sequential order being a sequential order of first patterns of light and second patterns of light in which the first patterns of light and the second patterns of light projected in the first sequential order are swapped with each other; and obtaining intersection point positions of gradation values between (i) the respective image data of the object for each projected pattern of light of the first group of patterns of light and (ii) the respective image data of the object for each projected pattern of light of the second group of patterns of light obtained at corresponding imaging times when the first group of patterns of light and the second group of patterns of light are projected onto the object, and calculating information of a shape of the object based on the obtained intersection point positions, wherein a time interval between (iii) a time when obtainment of the image data of the object for each projected pattern of light of the first group of patterns of light starts and (iv) a time when obtainment of the image data of the object for each projected pattern of light of the second group of patterns of light starts equals an integer multiple of the period of intensity of the light other than the first and second patterns of light radiated to the object.

8. A system which includes a measuring device for measuring an object, and a robot for holding and moving the object based on a measurement result using the measuring device, the measuring device including:
- a control unit configured to acquire information on a period of intensity of a light other than patterns of light radiated to the object, and control a projector configured to project a first pattern of light having bright portions and dark portions or a second pattern of light having the bright portions and the dark portions of the first pattern of light in reverse onto the object and an imaging unit configured to acquire image data by imaging the object onto which the patterns of light are projected; and
- a processor configured to calculate information of the shape of the object based on the image data obtained by the imaging unit, wherein:
- the control unit controls the projector to project a first group of patterns of light onto the object by projecting first patterns of light and second patterns of light in a first sequential order and controls the imaging unit to image the object at each time a pattern of light of the first group of patterns of light is projected onto the object to respectively obtain image data of the object for each projected pattern of light of the first group of patterns of light,
- the control unit controls the projector to project a second group of patterns of light onto the object by projecting first patterns of light and second patterns of light in a second sequential order different from the first sequential order and controls the imaging unit to image the object at each time a pattern of light of the second group of patterns of light is projected onto the object to respectively obtain image data of the object for each projected pattern of light of the second group of patterns of light, the second sequential order being a sequential order of first patterns of light and second patterns of light in which the first patterns of light and the second patterns of light projected in the first sequential order are swapped with each other,
- a time interval between (i) a time when the imaging unit starts to obtain the image data of the object for each projected pattern of light of the first group of patterns of light and (ii) a time when the imaging unit starts to obtain the image data of the object for each projected pattern of light of the second group of patterns of light equals an integer multiple of the period of intensity of the light other than the patterns of light radiated to the object, and
- the processor obtains intersection point positions of gradation values between (iii) the respective image data of the object for each projected pattern of light of the first group of patterns of light and (iv) the respective image data of the object for each projected pattern of light of the second group of patterns of light obtained at corresponding imaging times when the first group of patterns of light and the second group of patterns of light are projected onto the object, and calculates information of a shape of the object based on the obtained intersection point positions.

9. A method of manufacturing an article comprising:
measuring an object using a measuring device; and
manufacturing the article by processing the object based on a result of the measurement,
wherein the measuring device includes:
- a control unit configured to acquire information on a period of intensity of a light other than patterns of light radiated to the object, and control a projector configured to project a first pattern of light having bright portions and dark portions or a second pattern of light having the bright portions and the dark portions of the first pattern of light in reverse onto the object and an imaging unit configured to acquire image data by imaging the object onto which the patterns of light are projected; and
- a processor configured to calculate information of the shape of the object based on the image data obtained by the imaging unit, wherein:
- the control unit controls the projector to project a first group of patterns of light onto the object by projecting first patterns of light and second patterns of light in a first sequential order and controls the imaging unit to image the object at each time a pattern of light of the first group of patterns of light is projected onto the object to respectively obtain image data of the object for each projected pattern of light of the first group of patterns of light,
- the control unit controls the projector to project a second group of patterns of light onto the object by projecting first patterns of light and second patterns of light in a second sequential order different from the first sequential order and controls the imaging unit to image the object at each time a pattern of light of the second group of patterns of light is projected onto the object to respectively obtain image data of the object for each projected pattern of light of the second group of patterns of light, the second sequential order being a sequential order of first patterns of light and second patterns of light in which the first patterns of light and the second patterns of light projected in the first sequential order are swapped with each other,
- a time interval between (i) a time when the imaging unit starts to obtain the image data of the object for each projected pattern of light of the first group of patterns of light and (ii) a time when the imaging unit starts to obtain the image data of the object for each projected pattern of light of the second group of patterns of light equals an integer multiple of the period of intensity of the light other than the patterns of light radiated to the object, and
- the processor obtains intersection point positions of gradation values between (iii) the respective image data of the object for each projected pattern of light of the first group of patterns of light and (iv) the respective image data of the object for each projected pattern of light of the second group of patterns of light obtained at corresponding imaging times when the first group of patterns of light and the second group of patterns of light are projected onto the object, and calculates information of a shape of the object based on the obtained intersection point positions.

* * * * *